(12) United States Patent
Zhao et al.

(10) Patent No.: US 9,002,403 B2
(45) Date of Patent: Apr. 7, 2015

(54) PORTABLE TERMINAL AND WIRELESS MODULE

(75) Inventors: Shiqing Zhao, Huizhou (CN); Dexiang Edward Luo, Huizhou (CN); Xuelong Ronald Hu, Huizhou (CN)

(73) Assignee: Huizhou TCL Mobile Communication Co., Ltd., Huizhou, Guangdong Province (CN)

( * ) Notice: Subject to any disclaimer, the term of this patent is extended or adjusted under 35 U.S.C. 154(b) by 275 days.

(21) Appl. No.: 13/519,132

(22) PCT Filed: May 16, 2012

(86) PCT No.: PCT/CN2012/075581
§ 371 (c)(1),
(2), (4) Date: Jun. 26, 2012

(87) PCT Pub. No.: WO2013/149424
PCT Pub. Date: Oct. 10, 2013

(65) Prior Publication Data
US 2013/0260829 A1  Oct. 3, 2013

(30) Foreign Application Priority Data

Apr. 1, 2012 (CN) .......................... 2012 1 0098395

(51) Int. Cl.
*H04B 1/38* (2006.01)
*H04M 1/02* (2006.01)

(52) U.S. Cl.
CPC ........... *H04B 1/3816* (2013.01); *H04M 1/0277* (2013.01); *H04M 2250/14* (2013.01)

(58) Field of Classification Search
CPC ..................... H04M 1/72519; H04M 2250/14; H04M 1/0202; H04M 1/0277

USPC .............. 455/90.1, 90.3, 550.1, 575.1, 575.5, 455/575.7, 558
See application file for complete search history.

(56) References Cited

U.S. PATENT DOCUMENTS

| 8,406,810 | B1 * | 3/2013 | Kamal et al. .................. 455/558 |
| 8,447,357 | B2 * | 5/2013 | Jung et al. ..................... 455/558 |
| 8,576,561 | B2 * | 11/2013 | Myers et al. ............. 361/679.56 |
| 2004/0146032 | A1 | 7/2004 | Lin |

FOREIGN PATENT DOCUMENTS

| CN | 1398137 | A | 2/2003 |
| CN | 2912172 | Y | 6/2007 |
| CN | 101583960 | A | 11/2009 |
| CN | 101925201 | A | 12/2010 |
| CN | 201700006 | U | 1/2011 |
| CN | 202587056 | U | 12/2012 |

* cited by examiner

*Primary Examiner* — Nhan Le
(74) *Attorney, Agent, or Firm* — Cheng-Ju Chiang

(57) ABSTRACT

A portable terminal and a wireless module are disclosed. The portable terminal comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein. Disposed on a module circuit board of the wireless module is an SIM card that is electrically connected to the module circuit board. In this way, the present disclosure can selectively reduce the cost of the portable terminal and substantially not increase the size of the portable terminal.

21 Claims, 16 Drawing Sheets

PORTABLE TERMINAL AND WIRELESS MODULE

FIELD OF THE INVENTION

The present disclosure generally relates to the technical field of wireless communication, and more particularly, to a portable terminal and a wireless module.

BACKGROUND OF THE INVENTION

As a development tendency of modern portable terminals such as tablet computers, the portable terminals become increasingly thinner in thickness. This represents a great technical challenge and is also an important indicator that users care about.

For example, currently the portable terminals are required to have more and more functions. For such a portable terminal, a part of hardware associated with these functions is integrated into the portable terminal while the rest of the hardware is externally connected to the portable terminal.

However, when the portable terminal needs to connect with external wireless communication devices such as LTE (Long Term Evolution) and 3G ($3^{rd}$-Generation) wireless communication devices, it is difficult to shrink the size of the overall system that includes the external wireless communication devices and the portable terminal. On the other hand, integrating the wireless communication devices into the portable terminal will necessarily increase the cost of the portable terminal.

SUMMARY OF THE INVENTION

Accordingly, a primary objective of the present disclosure is to provide a portable terminal and a wireless module, which can selectively reduce the cost of the portable terminal and substantially not increase the size of the portable terminal while still ensuring the operation performance of the wireless module.

To achieve the aforesaid objective, the present disclosure provides a portable terminal, which comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein, a guide rail for guiding insertion of the wireless module and a locating mechanism are disposed in the slot, and the locating mechanism is adapted to lock the wireless module to a first predetermined position in the slot after the wireless module has been inserted into the slot and reached the first predetermined position. The wireless module comprises a module base, a module circuit board fixed on the module base, and a subscriber identification module card (SIM) that is fixed on and electrically connected to the module circuit board. The module circuit board is provided with at least some electronic devices in a region corresponding to the SIM card. The module base is provided at a side thereof with a module antenna electrically connected to the module circuit board, and when the wireless module is inserted into the slot on the side surface of the terminal body, the side of the module base where the module antenna is disposed corresponds to an opening of the slot and the terminal circuit board is electrically connected to the module circuit board. The module circuit board is provided with an antenna post protruding from a surface of the module circuit board that is adjacent to the module antenna, a feeding point is disposed on the module antenna at a location corresponding to the antenna post, electrical connection between a side of the antenna post facing towards the module antenna and the feeding point of the module antenna is achieved through an elastic contact structure, and the elastic contact structure is a probe or an elastic piece.

Preferably, the module antenna is a laser direct structuring (LDS) antenna or an FPC antenna or a steel antenna, and covers a side surface of the module base and matches with the side surface of the module base in shape.

Preferably, disposed at the side of the module base where the module antenna is disposed is a housing baffle used as an antenna support, and a length of the housing baffle used as the antenna support in a direction of the side surface of the terminal body is greater than a length of the rest of the wireless module in the same direction.

To achieve the aforesaid objective, the present disclosure further provides a portable terminal, which comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein. The wireless module comprises a module base, a module circuit board fixed on the module base, and an SIM card that is fixed on and electrically connected to the module circuit board.

Preferably, the module circuit board is provided with at least some electronic devices in a region corresponding to the SIM card.

Preferably, the module base is provided at a side thereof with a module antenna electrically connected to the module circuit board, and when the wireless module is inserted into the slot on the side surface of the terminal body, the side of the module base where the module antenna is disposed corresponds to an opening of the slot and the terminal circuit board is electrically connected to the module circuit board.

Preferably, the module antenna is an LDS antenna or an FPC antenna or a steel antenna, and covers a side surface of the module base and matches with the side surface of the module base in shape.

Preferably, disposed at the side of the module base where the module antenna is disposed is a housing baffle used as an antenna support, and a length of the housing baffle used as the antenna support in a direction of the side surface of the terminal body is greater than a length of the rest of the wireless module in the same direction.

Preferably, the housing baffle used as the antenna support is a part of the wireless module, and the length of the housing baffle used as the antenna support in the direction of the side surface of the terminal body is greater than or equal to 85.60 mm.

Preferably, the module circuit board is provided with an antenna post protruding from a surface of the module circuit board that is adjacent to the module antenna, a feeding point is disposed on the module antenna at a location corresponding to the antenna post, and electrical connection between a side of the antenna post facing towards the module antenna and the feeding point of the module antenna is achieved through an elastic contact structure.

Preferably, the elastic contact structure is a probe or an elastic piece.

Preferably, the wireless module is a Long Term Evolution (LTE) or 3$^{rd}$-Generation (3G) wireless communication module.

Preferably, the terminal circuit board and the module circuit board are disposed side by side in a same plane when the wireless module is inserted into the slot located on the side surface of the terminal body.

Preferably, electrical connection between the terminal circuit board and the module circuit board is achieved through elastic piece pressing or through side plate pushing engagement.

Preferably, the terminal circuit board is provided with a notch at a side edge thereof, and the module circuit board is disposed within the notch at the side edge of the terminal circuit board when being electrically connected to the terminal circuit board.

Preferably, a guide rail for guiding insertion of the wireless module is disposed in the slot located on the side surface of the terminal body.

Preferably, the terminal circuit board is provided with a notch at a side edge thereof, the guide rail is disposed at two sides of the notch, the module circuit board is disposed within the notch at the side edge of the terminal circuit board when being electrically connected to the terminal circuit board, and the terminal circuit board and the module circuit board are disposed side by side in a same plane.

Preferably, a locating mechanism is disposed in the slot located on the side surface of the terminal body, and is adapted to lock the wireless module to a first predetermined position in the slot after the wireless module has been inserted into the slot and reached the first predetermined position.

Preferably, disposed at the side of the module base where the module antenna is disposed is a housing baffle used as an antenna support, a length of the housing baffle used as the antenna support in a direction of the side surface of the terminal body is greater than a length of the rest of the wireless module in the same direction, the slot is formed to have a greater width at an outer position than at an inner position to form the locating mechanism, and the length of the housing baffle used as the antenna support in the direction of the side surface of the terminal body matches with the width of the slot at the outer position and is greater than the width of the slot at the inner position.

Preferably, an unlocking mechanism is provided at the opening of the slot located on the side surface of the terminal body, and is adapted to release the wireless module from the first predetermined position when the wireless module is taken out.

To achieve the aforesaid objective, the present disclosure further provides a portable terminal, which comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein. The wireless module comprises a module base and a module circuit board fixed on the module base. The module base is provided at a side thereof with a module antenna electrically connected to the module circuit board, and when the wireless module is inserted into the slot on the side surface of the terminal body, the side of the module base where the module antenna is disposed corresponds to an opening of the slot and the terminal circuit board is electrically connected to the module circuit board.

To achieve the aforesaid objective, the present disclosure further provides a portable terminal, which comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein. The wireless module comprises a module base and a module circuit board fixed on the module base. When the wireless module is inserted into the slot located on the side surface of the terminal body, the terminal circuit board and the module circuit board are disposed side by side and the terminal circuit board is electrically connected to the module circuit board.

To achieve the aforesaid objective, the present disclosure further provides a portable terminal, which comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein, and a guide rail for guiding insertion of the wireless module is disposed in the slot. The wireless module comprises a module base and a module circuit board fixed on the module base. When the wireless module is inserted into the slot located on the side surface of the terminal body, the terminal circuit board is electrically connected to the module circuit board.

To achieve the aforesaid objective, the present disclosure further provides a portable terminal, which comprises a terminal body and a wireless module. The terminal body comprises a front surface and a back surface opposite to each other, side surfaces connected to the front surface and the back surface, and a terminal circuit board disposed in a space defined by the front surface, the back surface and the side surfaces together; and a display region is disposed on the front surface. The terminal body is provided on one of the side surfaces thereof with a slot for the wireless module to be inserted therein, a locating mechanism is disposed in the slot located on the side surface of the terminal body, and the locating mechanism is adapted to lock the wireless module to a first predetermined position in the slot after the wireless module has been inserted into the slot and reached the first predetermined position. The wireless module comprises a module base and a module circuit board fixed on the module base.

To achieve the aforesaid objective, the present disclosure further provides a wireless module. The wireless module is adapted to be inserted into a slot located on one of side surfaces of a terminal body, and comprises a module base, a module circuit board fixed on the module base, and an SIM card that is fixed on and electrically connected to the module circuit board.

Preferably, the module base is provided at a side thereof with a module antenna electrically connected to the module circuit board, and when the wireless module is inserted into the slot on the side surface of the terminal body, the side of the module base where the module antenna is disposed corresponds to an opening of the slot.

Preferably, the module antenna is an LDS antenna or an FPC antenna or a steel antenna, and covers a side surface of the module base and matches with the side surface of the module base in shape.

Preferably, disposed at the side of the module base where the module antenna is disposed is a housing baffle that matches with the side surface of the terminal body in shape and that is used as an antenna support, and a length of the housing baffle used as the antenna support in a direction of the side surface of the terminal body is greater than a length of the rest of the wireless module in the same direction.

Preferably, the length of the housing baffle used as the antenna support in the direction of the side surface of the terminal body is greater than or equal to 85.60 mm.

Preferably, the module circuit board is provided with an antenna post protruding from a surface of the module circuit board that is adjacent to the module antenna, a feeding point is disposed on the module antenna at a location corresponding to the antenna post, and electrical connection between a side of the antenna post facing towards the module antenna and the feeding point of the module antenna is achieved through an elastic contact structure.

Preferably, the elastic contact structure is a probe or an elastic piece.

Preferably, the wireless module is an LTE or 3G wireless communication module.

As compared to the prior art, the present disclosure has the following benefits: by disposing a slot on a side surface of the portable terminal and having the wireless module inserted into the slot, the consumer may choose to buy a portable terminal without a wireless module, so the cost of the portable terminal can be selectively reduced; meanwhile, because the display region of the portable terminal is of a certain size and there is relatively much room available inside the portable terminal, inserting the wireless module into the slot on the side surface of the terminal body will substantially not increase the size of the portable terminal and will make the portable terminal compact and aesthetic in appearance; and moreover, disposing on the module circuit board of the wireless module the SIM card electrically connected with the module circuit board will facilitate reduction in size of the wireless module, which helps to design a thinner or even ultra-thin portable terminal.

DETAILED DESCRIPTION OF THE INVENTION

Hereinbelow, the present disclosure will be described in detail with reference to embodiments thereof and the attached drawings.

Figure 1:
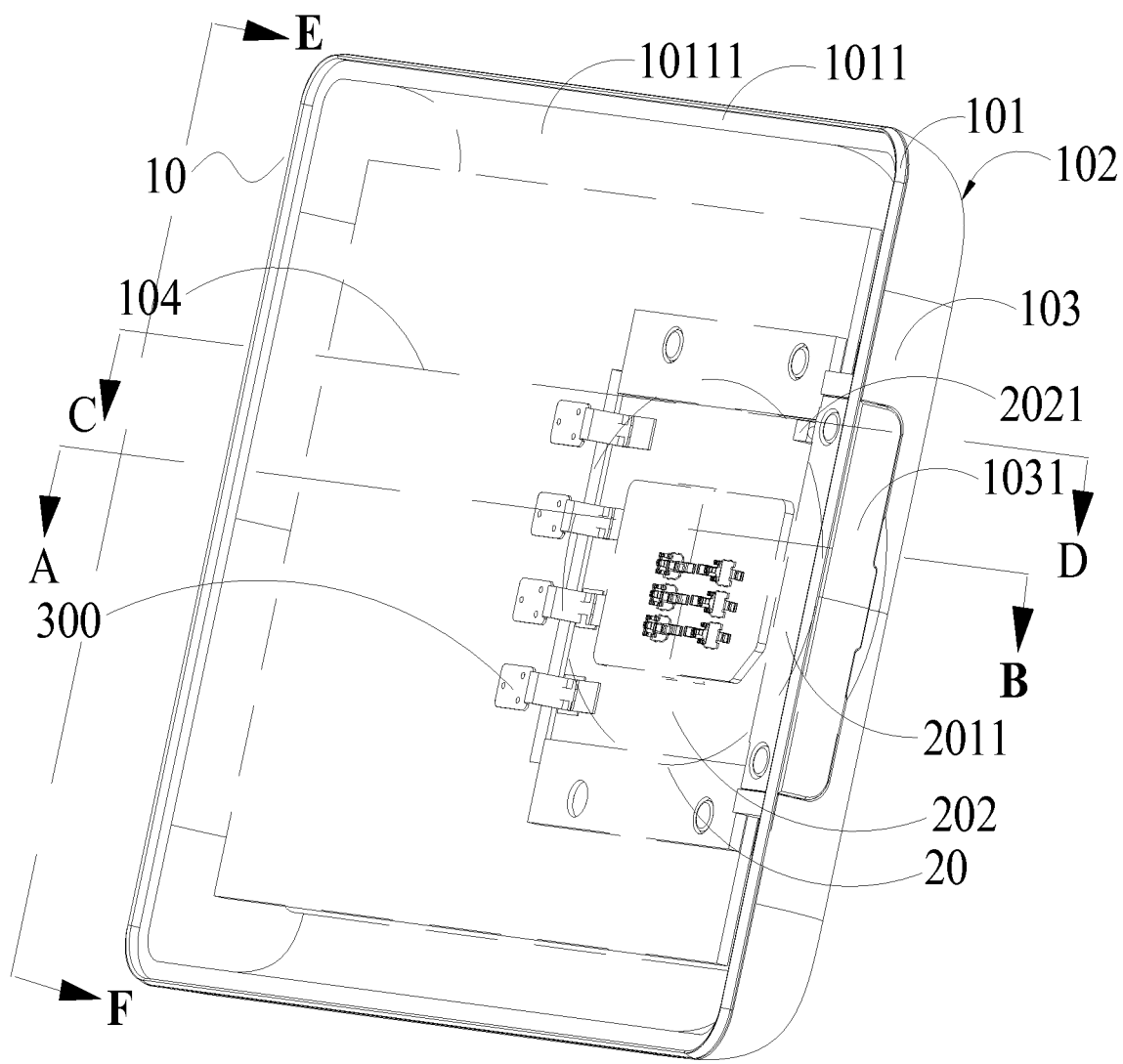
FIG. 1 is a perspective structural view illustrating an embodiment of a portable terminal of the present disclosure that adopts an LDS antenna.

Referring to FIG. 1 to FIG. 6, an embodiment of a portable terminal of the present disclosure comprises a terminal body 10 and a wireless module 20 (an elliptical dashed portion in FIG. 1). The terminal body 10 comprises a front housing 101 and a back housing 102, and a front surface 1011 acting as an outer surface of the front housing 101 is opposite to a back surface 1021 acting as an outer surface of the back housing 102. The terminal body 10 further comprises side surfaces 103 connected to the front surface 1011 and the back surface 1021, and a terminal circuit board 104 disposed in a space defined by the front surface 1011, the back surface 1021 and the side surfaces 103 together.

Specifically, a display region 10111 is disposed on the front surface 1011 of the front housing 101 as a display screen of the portable terminal. The terminal body 10 is provided on one of the side surfaces 103 thereof with a slot 1031 for the wireless module 20 to be inserted therein. The wireless module 20 that enables wireless communication connection of the portable terminal is a wireless communication module such as a Long Term Evolution (LTE) or $3^{rd}$-Generation (3G) wireless communication module. The wireless module 20 is inserted into the slot 1031 on the side surface 103 of the terminal body 10 and comprises a module base 201 and a module circuit board 202 fixed on the module base 201. Further, the module base 201 is provided at a side thereof with a module antenna 2011 electrically connected to the module circuit board 202; and when the wireless module 20 is inserted into the slot 1031 on the side surface 103 of the terminal body 10, the side of the module base 201 where the module antenna 2011 is disposed corresponds to an opening of the slot 1031. The module circuit board 202 and the terminal circuit board 104 are electrically connected via a conductive elastic piece mechanism 300.

The module antenna 2011 is a laser direct structuring (LDS) antenna, and covers an inner surface of a side of the module base 201 and matches with the inner surface of the side of the module base 201 in shape. The LDS antenna is an antenna made by the laser direct structuring technology, and usually by using laser to form a circuit within several seconds on a surface of an injection molded plastic housing. The circuit of the LDS antenna is highly integrated, and this can reduce the number of parts and make the LDS antenna more lightweight and smaller, which is favorable for saving the design space. Therefore, use of the LDS antenna in this embodiment allows the space occupied by the antenna to be reduced. Meanwhile, process characteristics of the LDS antenna allow the LDS antenna to cover surfaces of substrates (e.g., plastic substrates) of various forms and to be joined well with the substrates, so the LDS antenna can be made to be delicate and aesthetic in appearance and to have both high mechanical performances and high electronic performances. Of course, the module antenna 2011 may also be an FPC antenna or a steel antenna.

In actual applications, disposed at the side of the module base 201 where the module antenna 2011 is disposed is a housing baffle 2012 used as an antenna support, and an outer side surface of the housing baffle 2012 used as the antenna support matches in shape with the side surface of the terminal body 10 where the slot 1031 is disposed. Further, the housing baffle 2012 used as the antenna support is a part of the wireless module 20, and a length of the housing baffle 2012 used as the antenna support in a direction of the side surface 103 of the terminal body 10 is greater than a length of the rest of the wireless module 20 in the same direction, and is greater than or equal to 85.60 mm.

Figure 4:
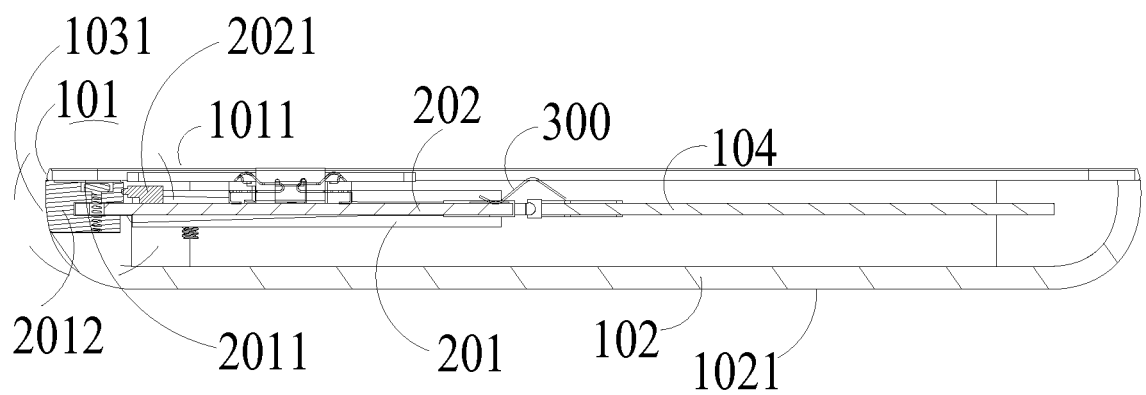
FIG. 4 is a cross-sectional view of the portable terminal of FIG. 1 taken along a line CD.
Figure 5:
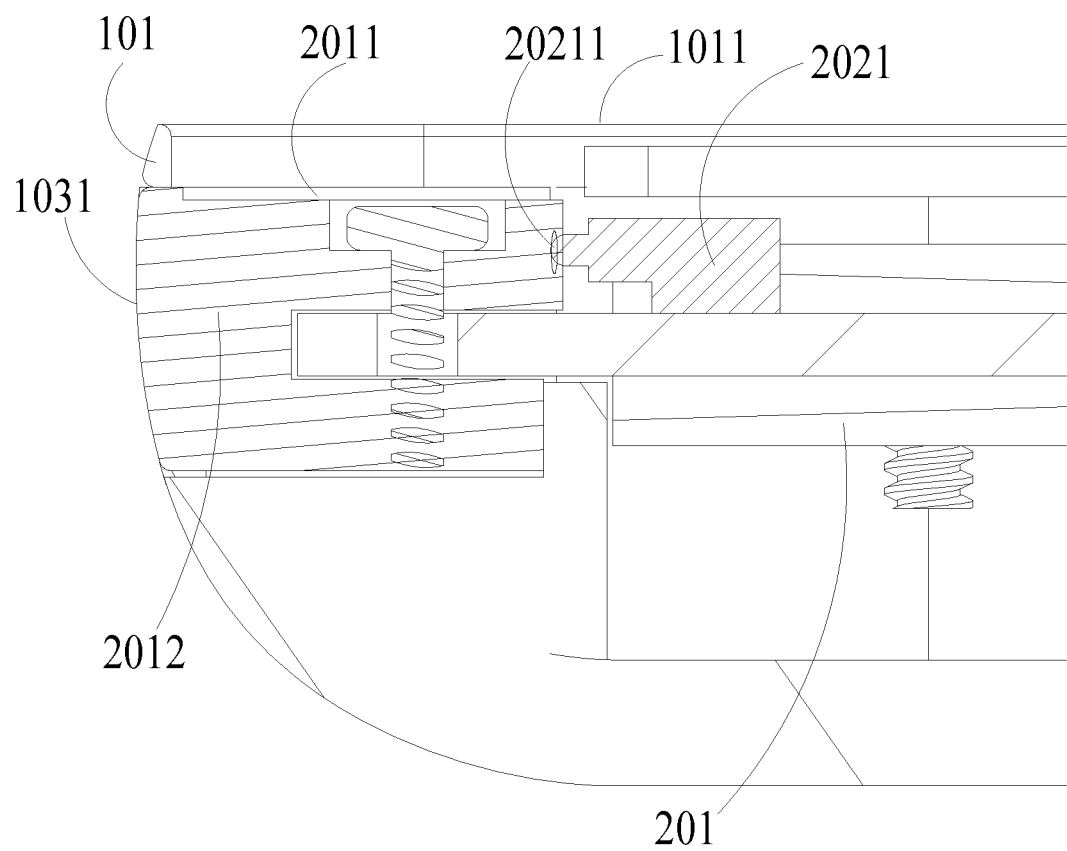
FIG. 5 is a schematic enlarged view of a portion circled by a dashed line in FIG. 4.
Figure 6:
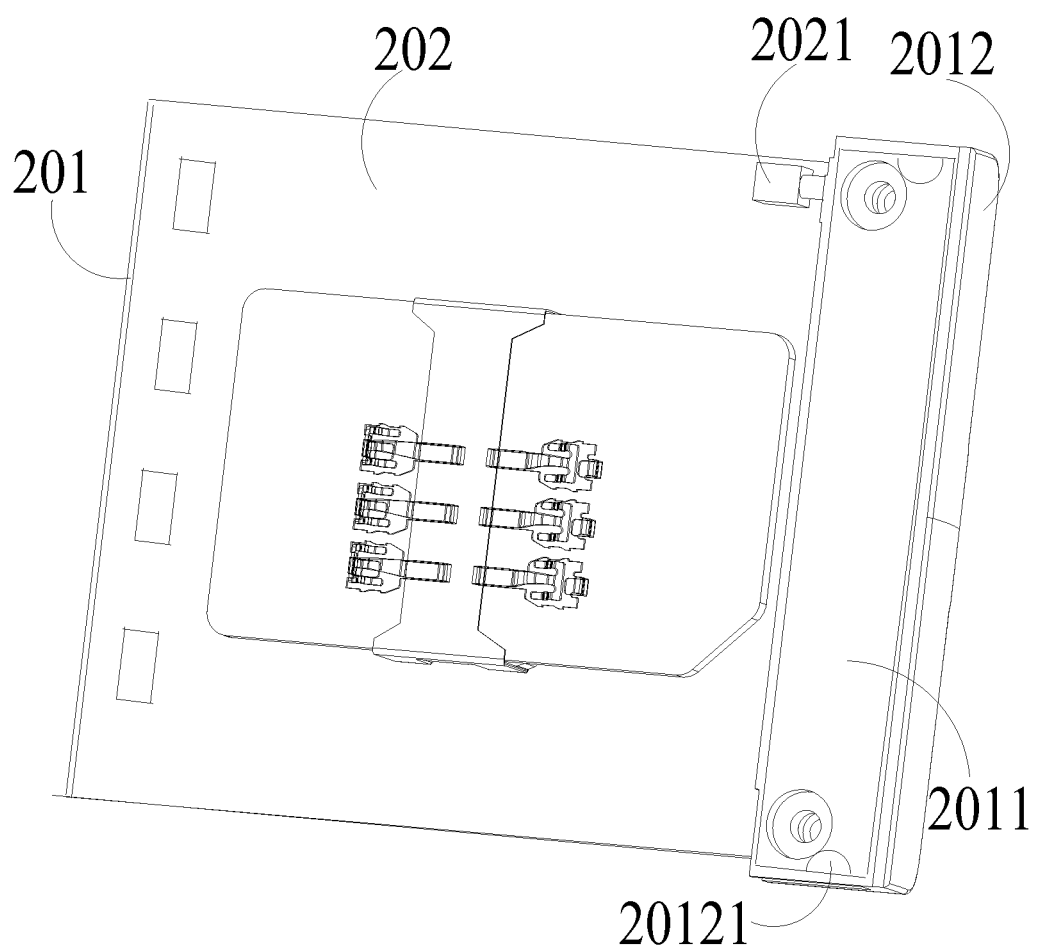
FIG. 6 is a perspective structural view of a wireless module shown in FIG. 1.

The module circuit board 202 is provided with an antenna post 2021 protruding from a surface of the module circuit board 202 that is adjacent to the module antenna 2011, as shown in FIG. 4 and FIG. 5. An antenna feeding point 20211 is disposed on the module antenna 2011 at a location corresponding to the antenna post 2021, and electrical connection between a side of the antenna post 2021 facing towards the module antenna 2011 and the feeding point 20211 of the module antenna 2011 is achieved through an elastic contact structure in the form of a gold-plated probe. Furthermore, the elastic contact structure may also be an elastic piece, and the present disclosure has no limitation thereon.

Of course, the wireless module 20 of this embodiment may also be a wireless communication module such as a WiFi wireless communication module, and the present disclosure also has no limitation thereon.

The portable terminal of this embodiment has the wireless module 20 inserted into the side surface 103 of the terminal body 10 so that the wireless module 20 will not be interfered by other signals from inside the terminal body 10. This not only makes full use of the space of the portable terminal but also improves the transceiving performance. Furthermore, disposing the module antenna 2011 of the wireless module 20 on the housing baffle 2012 used as the antenna support allows the module antenna 2011 to occupy a smaller space, and this can effectively reduce the thickness of the portable terminal so that a thinner or even ultra-thin portable terminal can be designed. Moreover, because the wireless module 20 is removably disposed into the terminal body 10, various wireless communication devices can be flexibly disposed in the portable terminal, which can selectively reduce the cost.

Figure 2:
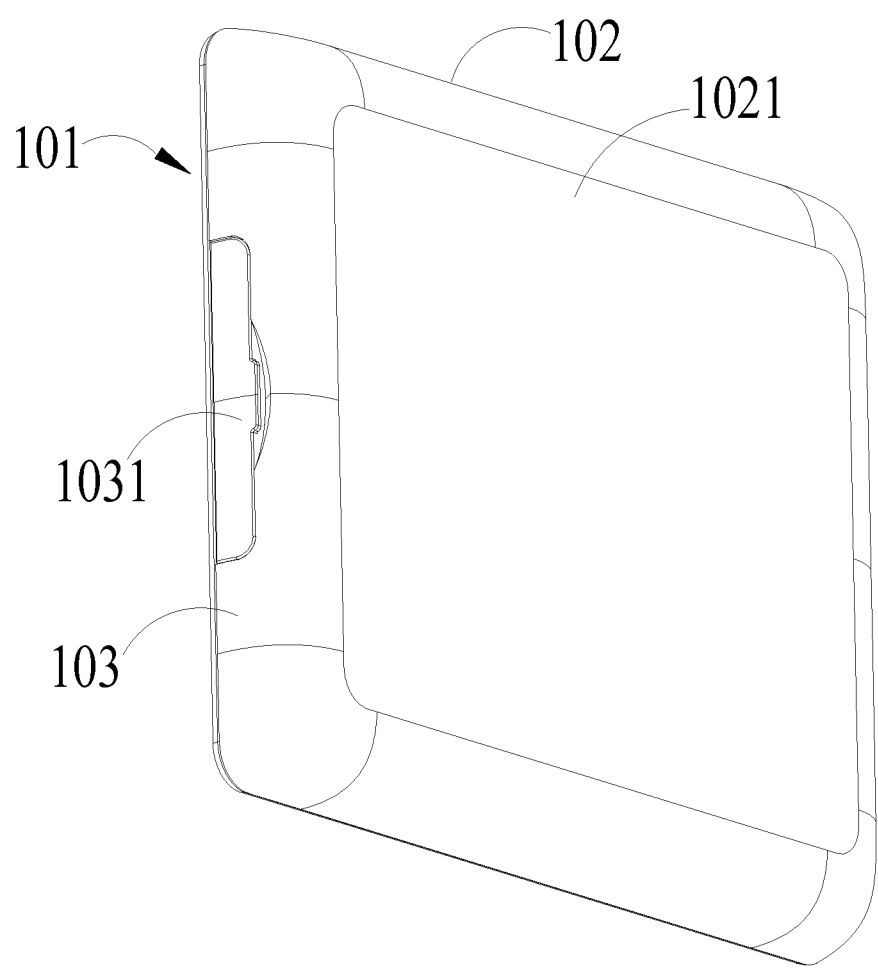
FIG. 2 is a schematic perspective view illustrating the portable terminal of FIG. 1 from the back side.
Figure 3:
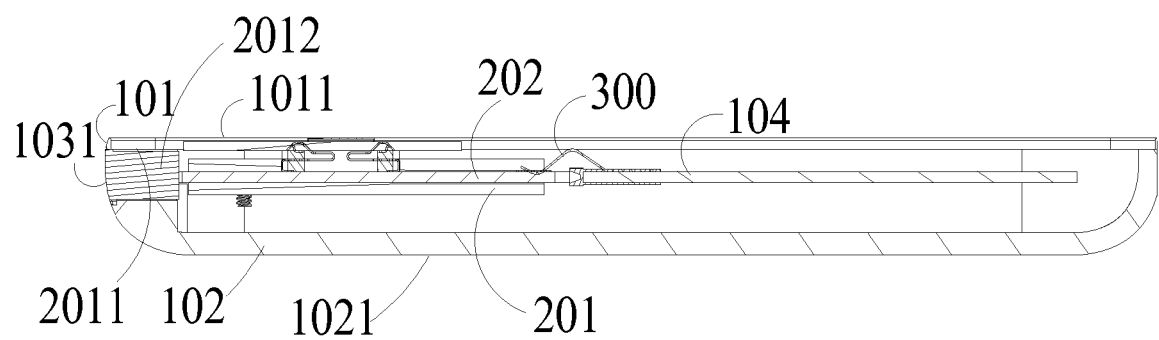
FIG. 3 is a cross-sectional view of the portable terminal of FIG. 1 taken along a line AB.
Figure 7:
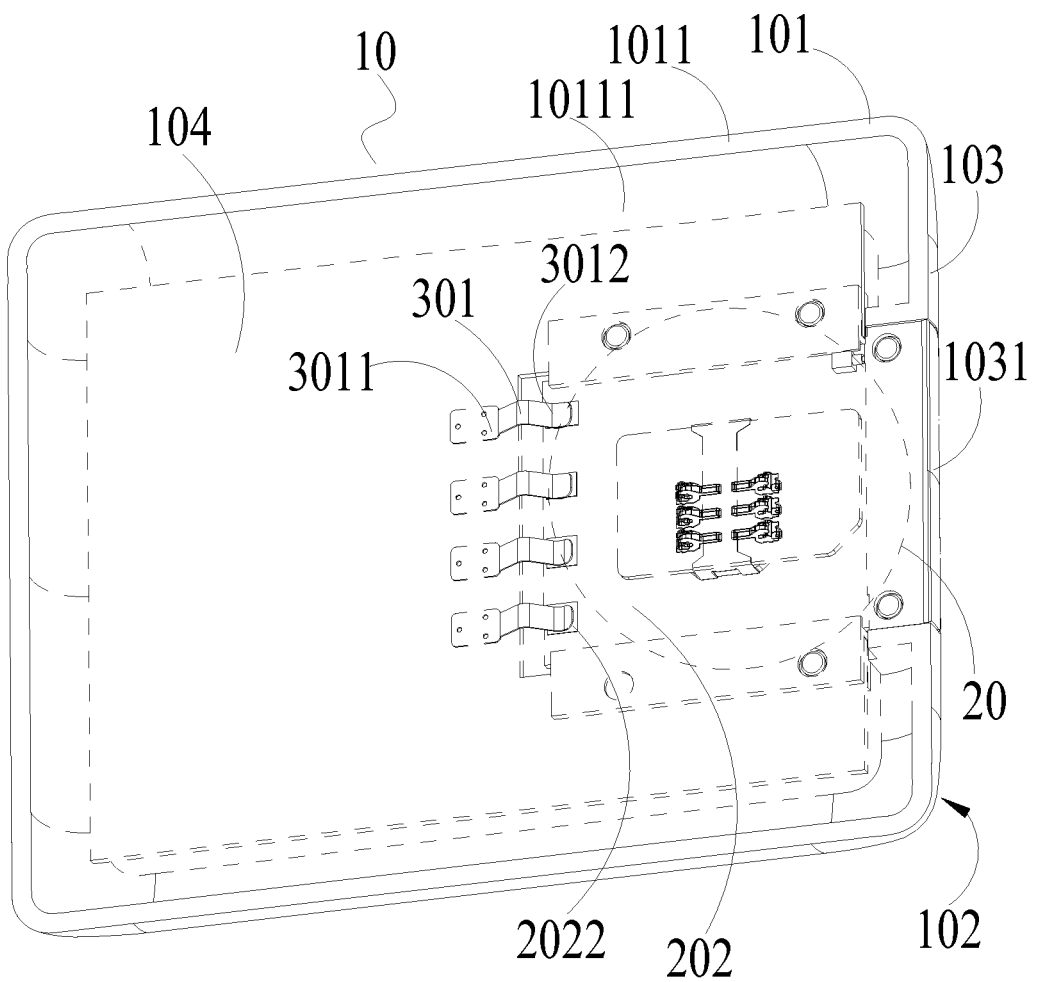
FIG. 7 is a perspective structural view illustrating an embodiment of the portable terminal of the present disclosure in which connection is achieved through elastic piece pressing.

Referring to FIG. 7 in combination with FIG. 2 and FIG. 3, another embodiment of the portable terminal of the present disclosure comprises a terminal body 10 and a wireless module 20 (a circular dashed portion in the figure). The terminal body 10 comprises a front housing 101 and a back housing 102, and a front surface 1011 acting as an outer surface of the front housing 101 is opposite to a back surface 1021 acting as an outer surface of the back housing 102. The terminal body 10 further comprises side surfaces 103 connected to the front surface 1011 and the back surface 1021, and a terminal circuit board 104 disposed in a space defined by the front surface 1011, the back surface 1021 and the side surfaces 103 together.

Specifically, a display region 10111 is disposed on the front surface 1011 of the front housing 101 as a display screen of the portable terminal. The terminal body 10 is provided on one of the side surfaces 103 thereof with a slot 1031 for the wireless module 20 to be inserted therein. The wireless module 20 that enables wireless communication connection of the portable terminal is a wireless communication module such as an LTE or 3G wireless communication module. The wireless module 20 is inserted into the slot 1031 on the side surface 103 of the terminal body 10, and comprises a module base 201 and a module circuit board 202 fixed on the module base 201. Further, the module base 201 is provided at a side thereof with a module antenna 2011 electrically connected to the module circuit board 202; and when the wireless module 20 is inserted into the slot 1031 on the side surface 103 of the terminal body 10, the side of the module base 201 where the module antenna 2011 is disposed corresponds to an opening of the slot 1031. The module circuit board 202 and the terminal circuit board 104 are electrically connected.

When the wireless module 20 is inserted into the slot 1031 on the side surface 103 of the terminal body 10, the terminal circuit board 104 and the module circuit board 202 are disposed side by side. By "disposed side by side", it means that the terminal circuit board 104 and the module circuit board 202 are disposed side by side in a same plane.

The terminal circuit board 104 and the module circuit board 202 are electrically connected through elastic piece pressing. Specifically, each of elastic pieces 301 is raised in the middle and flat at two ends so as to generate an elastic force when the two ends are pressed. A first end 3011 of the elastic piece 301 is fixed on the terminal circuit board 104, and a second end 3012 of the elastic piece 301 extends towards the module circuit board 202. Conductive elastic piece perforations 2022 are formed in the module circuit board 202 at positions corresponding to the second ends 3012 of the elastic pieces 301. When the module circuit board 202 is inserted into the slot 103, the second end 3012 of each of the elastic pieces 301 enters into one of the elastic piece perforations 2022 of the module circuit board 202. The module circuit board 202 is inserted until reaching a proper position, and at this point, a distance from the elastic piece perforation 2022 to the terminal circuit board 104 is smaller than a length of the elastic piece 301. Then, the second end 3012 of the elastic piece 301 is pressed by the elastic piece perforation 2022 so that the elastic piece 301 generates an elastic force and is pressed towards the elastic piece perforation 2022. Thus, the elastic piece 301 and the elastic piece perforation 2022 are pressed against each other under the action of the elastic force, thereby achieving electrical connection between the terminal circuit board 104 and the module circuit board 202.

Figure 8:
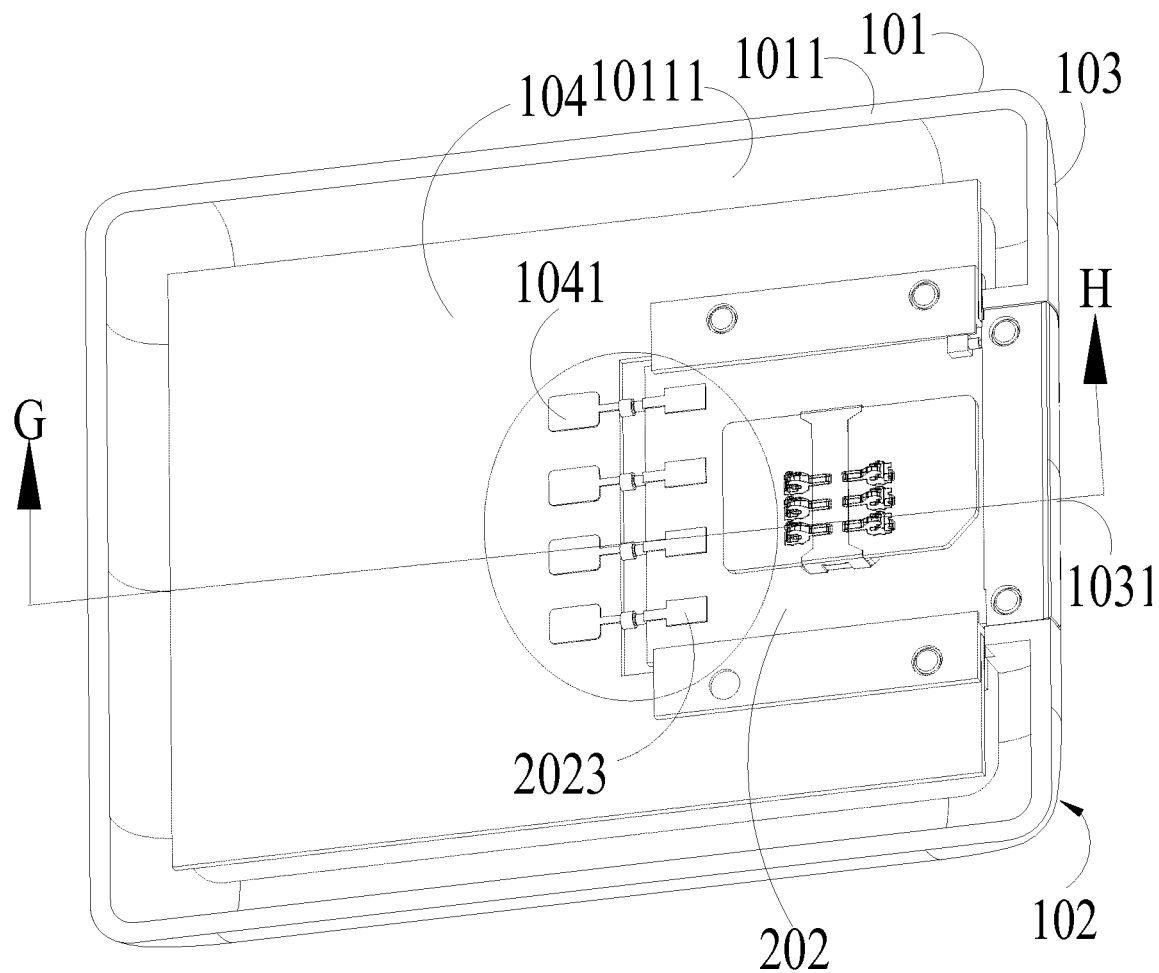
FIG. 8 is a perspective structural view illustrating an embodiment of the portable terminal of the present disclosure in which connection is achieved through side plate pushing.
Figure 9:
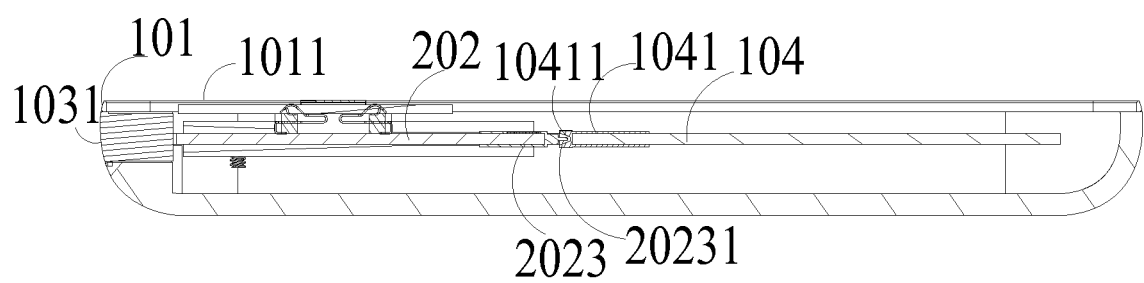
FIG. 9 is a cross-sectional view of the portable terminal shown in FIG. 8 taken along a line GH.

Furthermore, the terminal circuit board 104 and the module circuit board 202 may also be electrically connected through side plate pushing engagement. Specifically, referring to FIG. 8 and FIG. 9, the terminal circuit board 104 is provided with first connecting posts 1041, and each of the first connecting posts 1041 is provided at a top end thereof with a recess 10411 facing towards the module circuit board 202. The module circuit board 202 is provided with second connecting posts 2023, and each of the second connecting posts 2023 is provided with a protrusion 20231 facing towards the terminal circuit board 104 and matching with the recess 10411 of the first connecting post 1041. When the wireless module 20 is inserted into the slot 1031 and locked to a predetermined position, the protrusion 20231 of the second connecting post 2023 is embedded into the recess 10411 of the first connecting post 1041, thereby achieving electrical connection between the terminal circuit board 104 and the module circuit board 202.

Figure 10:
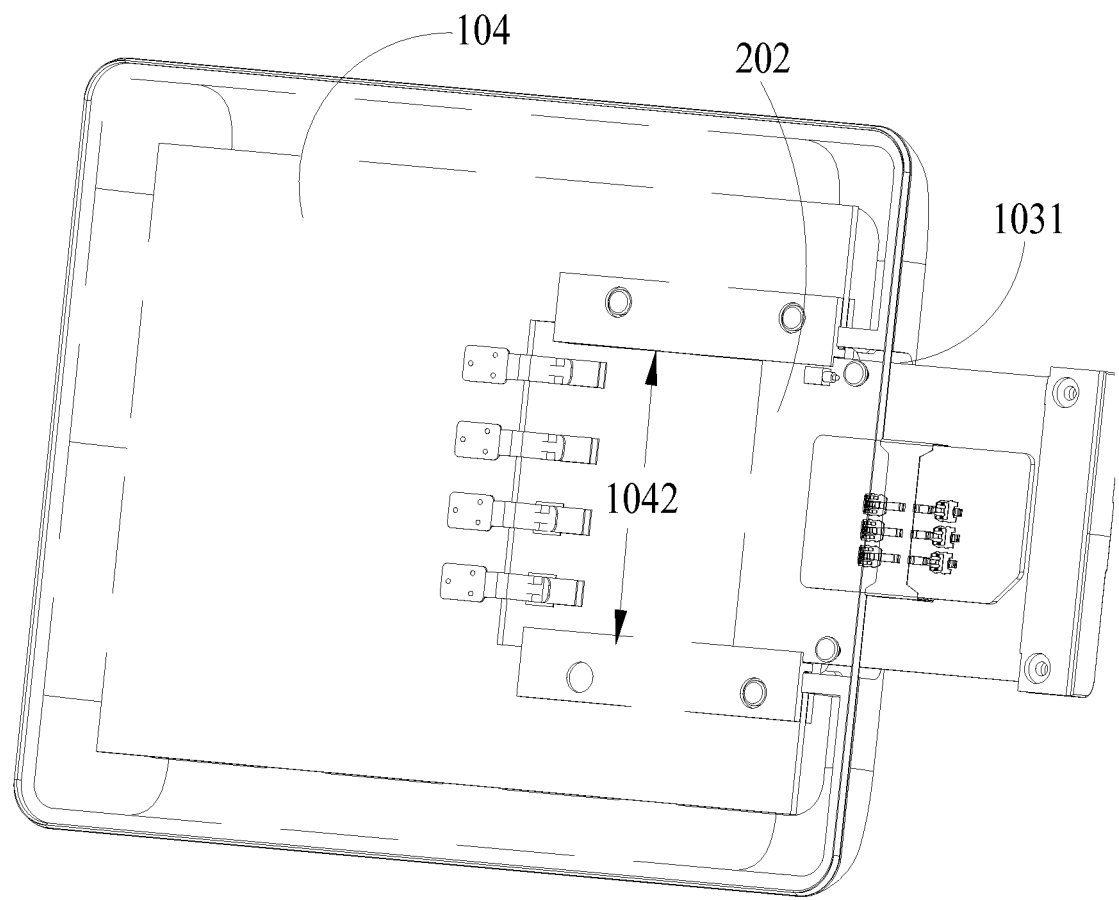
FIG. 10 is a perspective view illustrating a process in which a module circuit board shown in FIG. 7 is inserted into a notch at a side edge of a terminal circuit board during electrical connection between the module circuit board and the terminal circuit board.

Referring to FIG. 10, the terminal circuit board 104 is provided with a notch 1042 at a side edge thereof, and the module circuit board 202 is disposed within the notch 1042 at the side edge of the terminal circuit board 104 when being electrically connected to the terminal circuit board 104. Specifically, the terminal circuit board 104 is provided with the notch 1042 at the side edge corresponding to the slot 1031; and when the module circuit board 202 is inserted into the slot 1031 and electrically connected to the terminal circuit board 104, the module circuit board 202 is disposed within the notch 1042 at the side edge.

The portable terminal of this embodiment has the wireless module 20 inserted into the side surface 103 of the terminal body 10, so the wireless module 20 will not be interfered by other signals from inside the terminal body 10. This not only makes full use of the space of the portable terminal but also improves the transceiving performance. Furthermore, because the terminal circuit board 104 and the module circuit board 202 are arranged side by side in the same plane rather than being overlapped or partially overlapped, an arrangement height of the terminal circuit board 104 and the module circuit board 202 is reduced, and this effectively reduces the thickness of the portable terminal so that a thinner or even ultra-thin portable terminal can be designed. Moreover, because the wireless module 20 is removably inserted into the terminal body 10, various wireless communication devices can be flexibly arranged in the portable terminal, which can selectively reduce the cost. Furthermore, because the terminal circuit board 104 and the module circuit board 202 are electrically connected through elastic piece pressing or through side plate pushing engagement, the reliability of electrical connection between the terminal circuit board 104 and the module circuit board 202 can be enhanced.

Figure 11:
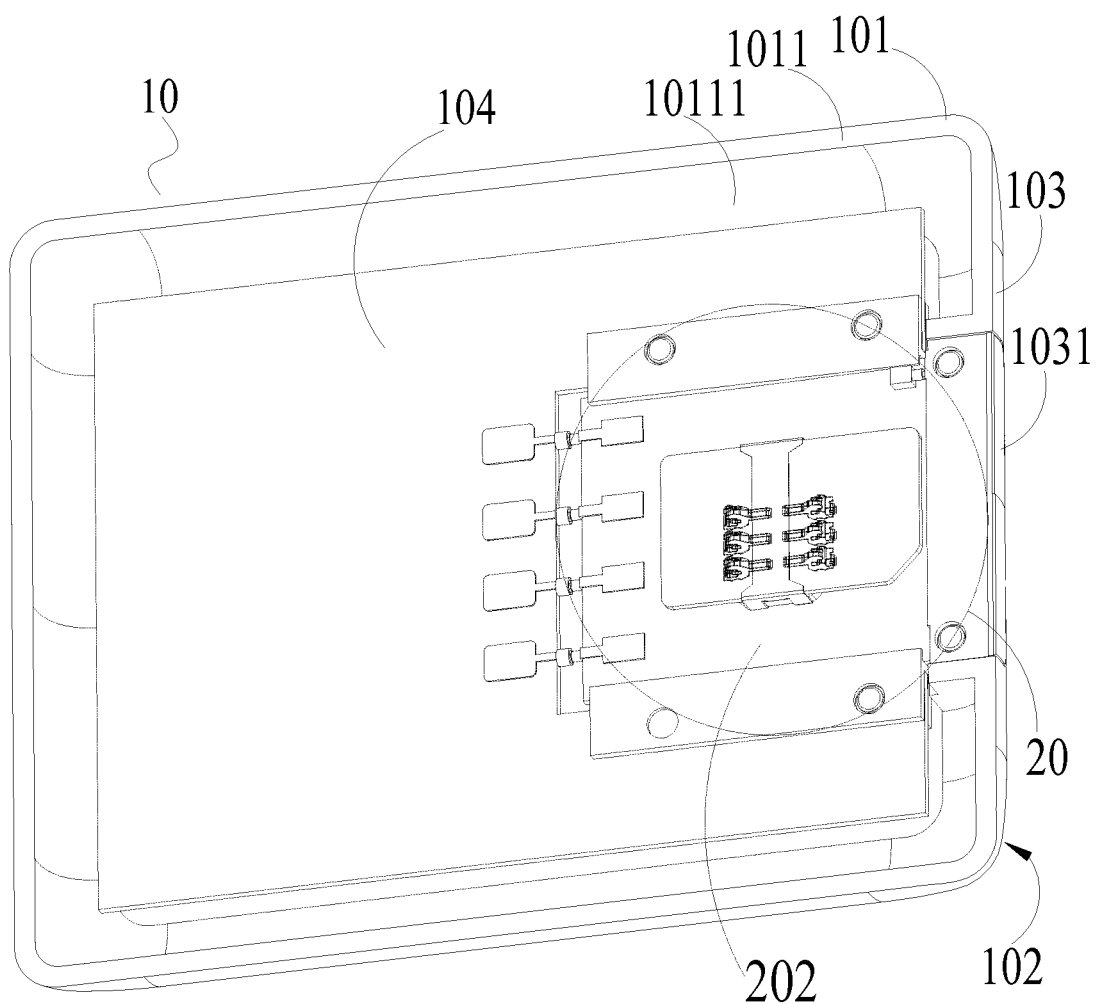
FIG. 11 is a perspective structural view illustrating an embodiment of the portable terminal of the present disclosure in which a guide rail is disposed in a slot.
Figure 12:
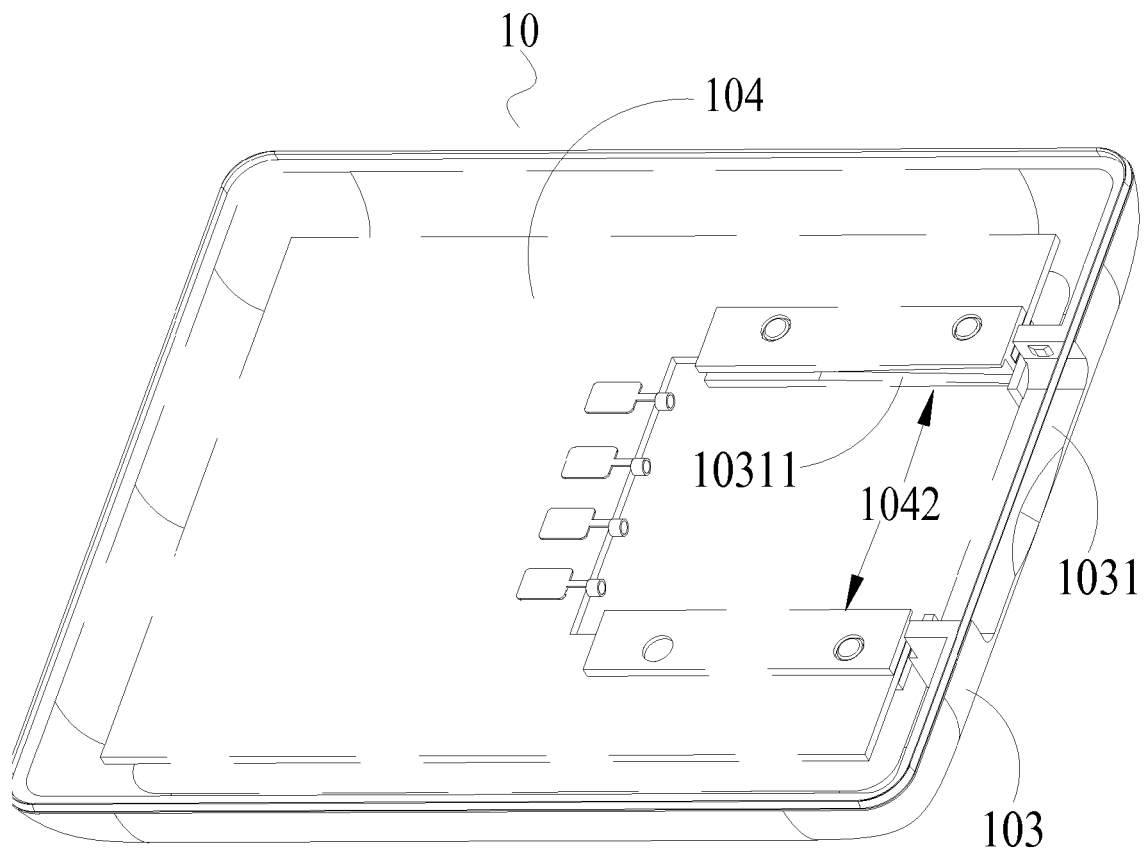
FIG. 12 is a schematic perspective view illustrating a structure of the slot shown in FIG. 11.

Referring to FIG. 11 and FIG. 12 in combination with FIG. 2 and FIG. 3, a further embodiment of the portable terminal of the present disclosure comprises a terminal body 10 and a wireless module 20. The terminal body 10 comprises a front housing 101 and a back housing 102, and a front surface 1011 acting as an outer surface of the front housing 101 is opposite to a back surface 1021 acting as an outer surface of the back housing 102. The terminal body 10 further comprises side surfaces 103 connected to the front surface 1011 and the back surface 1021, and a terminal circuit board 104 disposed in a space defined by the front surface 1011, the back surface 1021 and the side surfaces 103 together.

Specifically, a display region 10111 is disposed on the front surface 1011 of the front housing 101 as a display screen of the portable terminal. The terminal body 10 is provided on one of the side surfaces 103 thereof with a slot 1031 for the wireless module 20 to be inserted therein. The wireless module 20 that enables wireless communication connection of the portable terminal is a wireless communication module such as an LTE or 3G wireless communication module. The wireless module 20 is inserted into the slot 1031 on the side surface 103 of the terminal body 10, and comprises a module base 201 and a module circuit board 202 fixed on the module base 201. Further, the module base 201 is provided at a side thereof with a module antenna 2011 electrically connected to the module circuit board 202; and when the wireless module 20 is inserted into the slot 1031 on the side surface 103 of the terminal body 10, the side of the module base 201 where the module antenna 2011 is disposed corresponds to an opening of the slot 1031. The module circuit board 202 and the terminal circuit board 104 are electrically connected.

A guide rail 10311 for guiding insertion of the wireless module 20 is disposed in the slot 1031 on the side surface 103 of the terminal body 10. Specifically, the terminal circuit board 104 is provided with a notch 1042 at a side edge thereof corresponding to the side surface 103, and the guide rail 10311 is disposed at two sides of the notch 1042. The module circuit board 202 is disposed within the notch 1042 at the side edge of the terminal circuit board 104 when being electrically connected to the terminal circuit board 104, and the module circuit board 202 and the terminal circuit board 104 are arranged in a same plane.

The portable terminal of this embodiment has the wireless module 20 inserted on the side surface 103 of the terminal body 10, so the wireless module 20 will not be interfered by other signals from inside the terminal body 10. This not only makes full use of the space of the portable terminal but also improves the transceiving performance. Furthermore, the guide rail 10311 is disposed in the slot 1031 on the side surface 103 of the terminal body 10 so that the wireless module 20 is inserted into and removed from the slot 1031 through the guide rail of a board-to-board form; this allows the wireless module 20 to be accurately positioned when entering into the terminal body 10 so that the wireless module 20 and the terminal body 10 can be properly electrically connected instead of being prone to misaligned connection. Also, when being inserted into and removed from the slot 1031, the module circuit board 202 is arranged side by side with the terminal circuit board 104 in a same plane, which also helps to reduce the thickness of the portable terminal.

Figure 13:
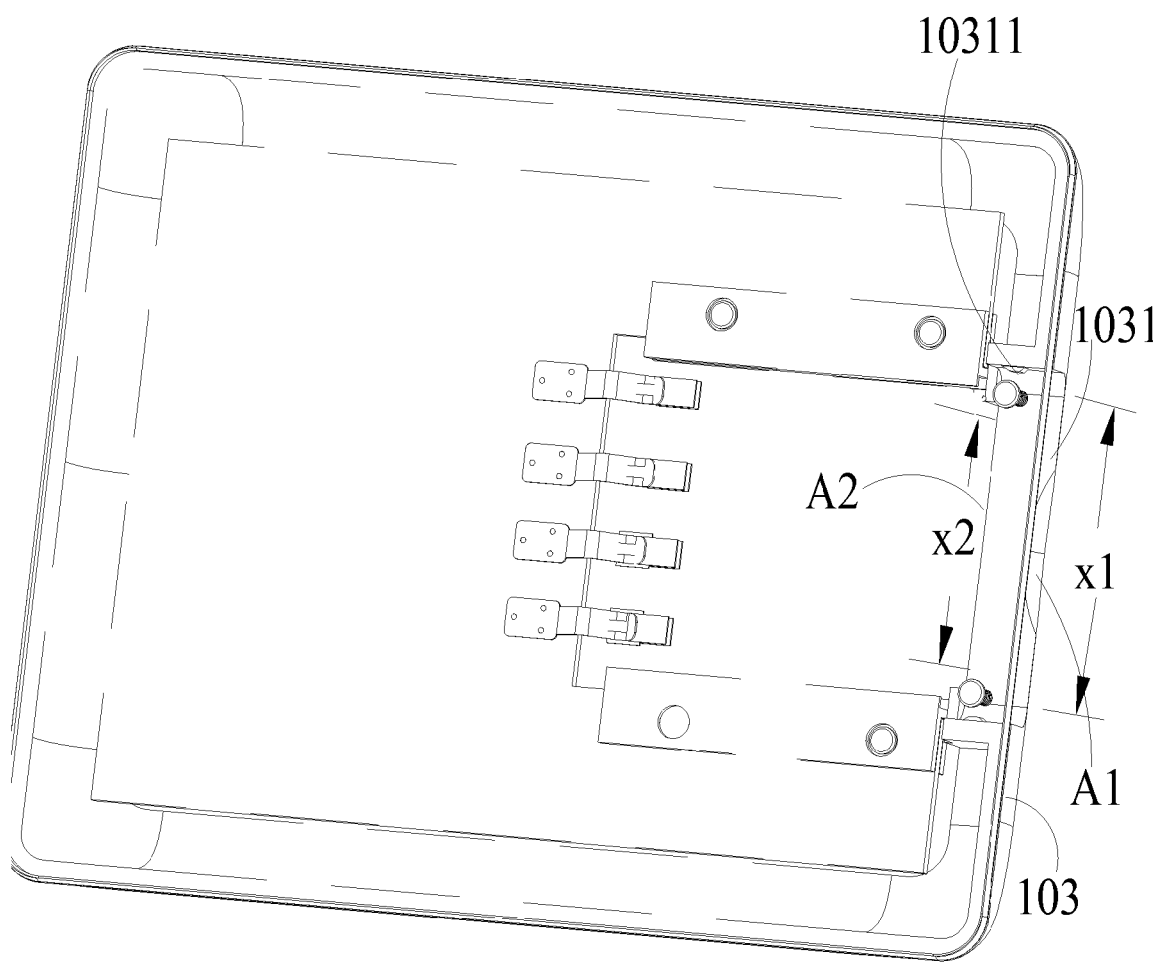
FIG. 13 is a perspective structural view illustrating an embodiment of a locating mechanism disposed in the slot on a side surface of a terminal body of the present disclosure.
Figure 14:
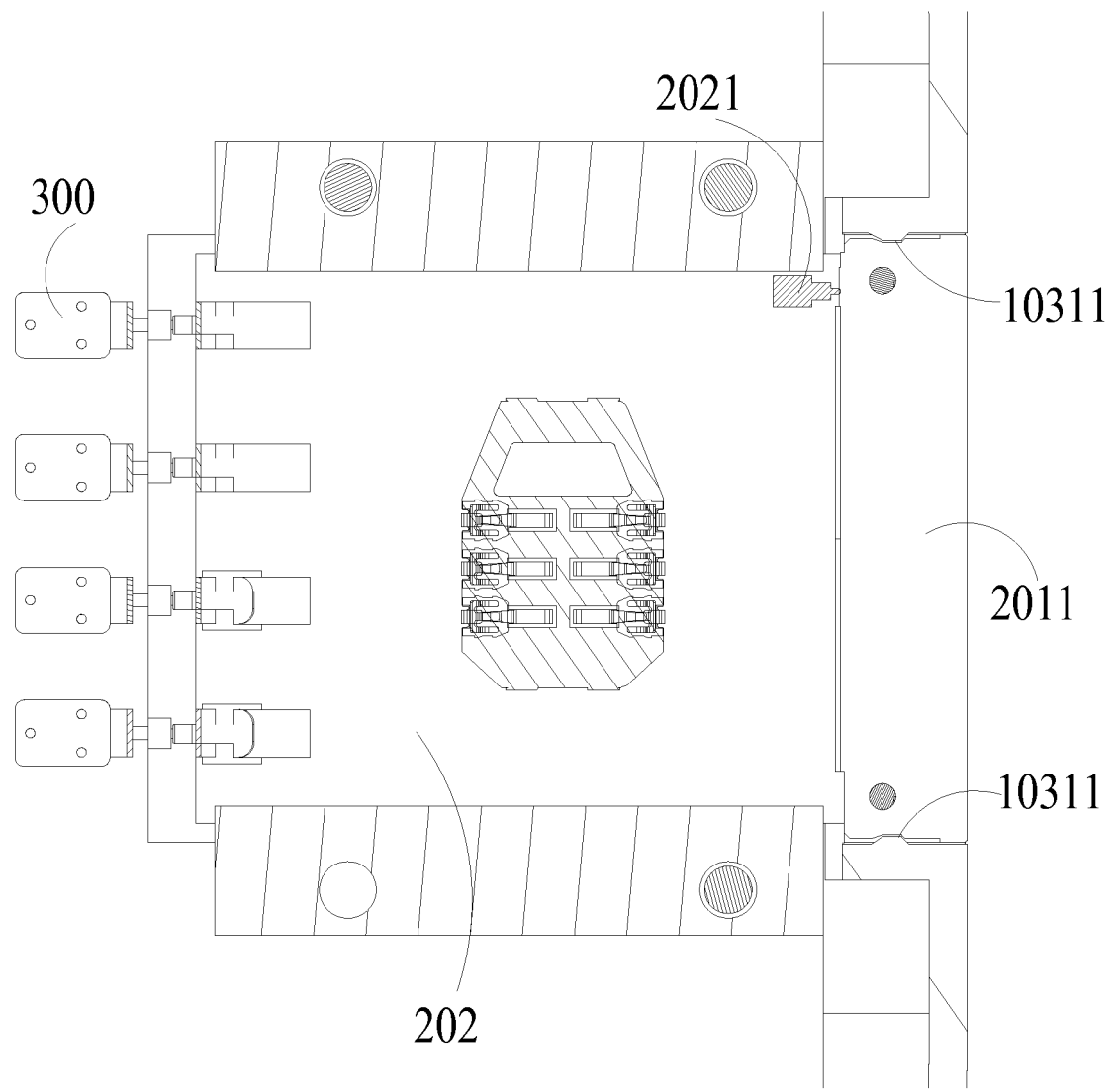
FIG. 14 is a partial cross-sectional view of the portable terminal of FIG. 1 taken along a line EF.

Referring to FIG. 13 and FIG. 14 in combination with FIG. 1 to FIG. 3, yet a further embodiment of the portable terminal of the present disclosure comprises a terminal body 10 and a wireless module 20. The terminal body 10 comprises a front housing 101 and a back housing 102, and a front surface 1011 acting as an outer surface of the front housing 101 is opposite to a back surface 1021 acting as an outer surface of the back housing 102. The terminal body 10 further comprises side surfaces 103 connected to the front surface 1011 and the back surface 1021, and a terminal circuit board 104 disposed in a space defined by the front surface 1011, the back surface 1021 and the side surfaces 103 together.

Specifically, a display region 10111 is disposed on the front surface 1011 of the front housing 101 as a display screen of the portable terminal. The terminal body 10 is provided on one of the side surfaces 103 thereof with a slot 1031 for the wireless module to be inserted therein. The wireless module 20 that enables wireless communication connection of the portable terminal is a wireless communication module such as an LTE or 3G wireless communication module. The wireless module 20 is inserted into the slot 1031 on the side surface 103 of the terminal body 10, and comprises a module base 201 and a module circuit board 202 fixed on the module base 201. Further, the module base 201 is provided at a side thereof with a module antenna 2011 electrically connected to the module circuit board 202; and when the wireless module 20 is inserted into the slot 1031 on the side surface 103 of the terminal body 10, the side of the module base 201 where the module antenna 2011 is disposed corresponds to an opening of the slot 1031. The module circuit board 202 and the terminal circuit board 104 are electrically connected.

A locating mechanism (not shown) is disposed in the slot 1031 on the side surface 103 of the terminal body 10, and is adapted to lock the wireless module 20 to a first predetermined position in the slot 1031 after the wireless module 20 has been inserted into the slot 1031 and reached the first predetermined position. Specifically, disposed at the side of the module base 201 where the module antenna 2011 is disposed is a housing baffle 2012 used as an antenna support. A length of the housing baffle 2012 used as the antenna support in a direction of the side surface 103 of the terminal body 10 is greater than a length of the rest of the wireless module 20 in the same direction. The slot 1031 is formed to have a width x1 at an outer position A1 that is greater than a width x2 at an inner position A2 so that the locating mechanism for the wireless module 20 is formed. Moreover, the length of the housing baffle 2012 used as the antenna support in the direction of the side surface 103 of the terminal body 10 matches with the width x1 of the slot 1031 at the outer position A1 and is greater than the width x2 of the slot 1031 at the inner position A2. For this reason, when the rest of the wireless module 20 except the housing baffle 2012 used as the antenna support enters into the slot 1031 after the wireless module 20 is inserted into the slot 1031, the housing baffle 2012 used as the antenna support is stuck at the outer position A1 of the slot 1031 without entering into the slot 1031. Thus, the wireless module 20 is locked into place and prevented from continuing to be inserted into the slot 1031, and at this point, we say that the wireless module 20 reaches the first predetermined position.

Elastic position locking mechanisms 10311 are further disposed on two side edges at the opening of the slot 1031. The position locking mechanisms 10311 are raised with respect to the two side edges at the opening of the slot 1031, and two ends of the housing baffle 2012 used as the antenna support are both provided with a recess 20121. After the wireless module 20 reaches the first predetermined position, each of the position locking mechanisms 10311 embeds into one of the recesses 20121 of the housing baffle 2012 used as the antenna support. Then, the wireless module 20 can be secured into the terminal body 10 to avoid loose of the wireless module 20 that would affect electrical connection between the wireless module 20 and the terminal body 10. Correspondingly, the position locking mechanisms 10311 also have an unlocking function, that is, also serve as unlocking mechanisms. Specifically, when the wireless module 20 is to be removed, the wireless module is pulled out by an external force; and under the action of the pulling force, the position locking mechanisms retract towards the two side edges to disengage from the recesses 20121 of the housing baffle 2012 used as the antenna support, thereby releasing the wireless module 20.

The portable terminal of this embodiment has the wireless module 20 inserted into the side surface 103 of the terminal body 10, so the wireless module 20 will not be interfered by other signals inside the terminal body 10. This not only makes full use of the space of the portable terminal but also improves the transceiving performance. Furthermore, by disposing the locating mechanism and the position locking mechanisms for the wireless module 20, the wireless module 20 can be blocked from being further inserted so as to prevent damage to the module circuit board 202 or the terminal circuit board 104. Meanwhile, this can secure the wireless module 20 into the terminal body 10, and enhance the reliability of electrical connection between the wireless module 20 and the terminal body 10. Also, disposition of the corresponding unlocking mechanisms makes it convenient to remove the wireless module.

Figure 15:
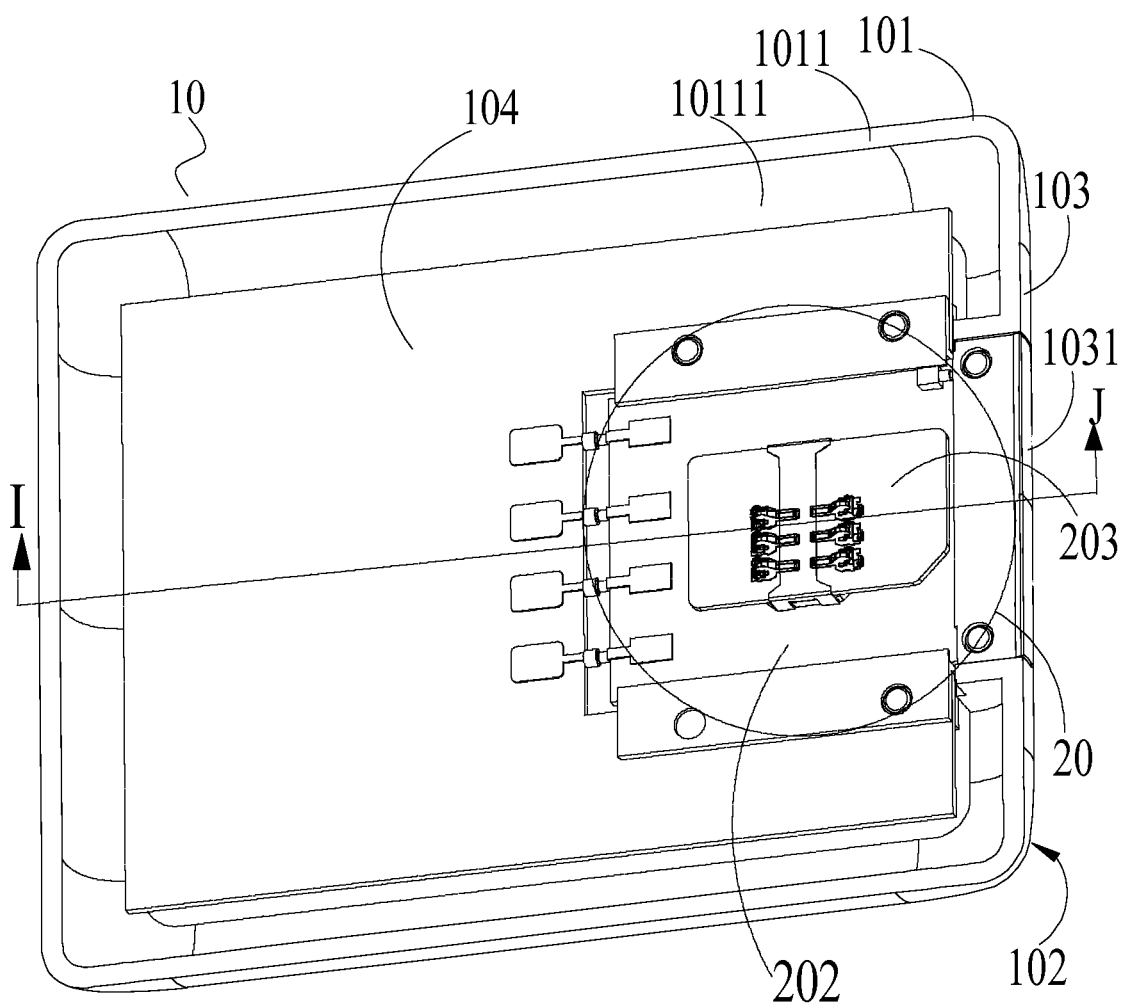
FIG. 15 is a perspective structural view illustrating an embodiment of the portable terminal of the present disclosure that has an SIM card.
Figure 16:
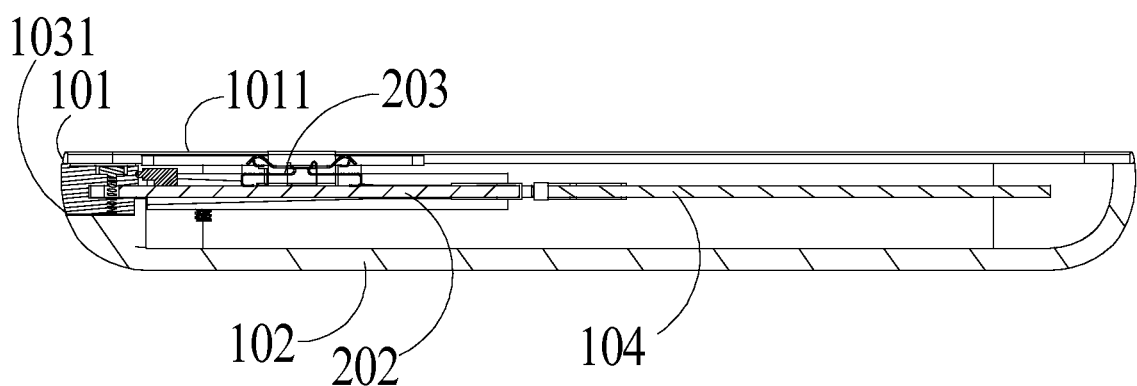
FIG. 16 is a cross-sectional view of the portable terminal of FIG. 15 taken along a line IJ.

Referring to FIG. 15 and FIG. 16, yet another embodiment of the portable terminal of the present disclosure comprises a terminal body 10 and a wireless module 20. The terminal body 10 comprises a front housing 101 and a back housing 102, and a front surface 1011 acting as an outer surface of the front housing 101 is opposite to a back surface 1021 acting as an outer surface of the back housing 102. The terminal body 10 further comprises side surfaces 103 connected to the front surface 1011 and the back surface 1021, and a terminal circuit board 104 disposed in a space defined by the front surface 1011, the back surface 1021 and the side surfaces 103 together.

Specifically, a display region 10111 is disposed on the front surface 1011 of the front housing 101 as a display screen of the portable terminal. The terminal body 10 is provided on one of the side surfaces 103 thereof with a slot 1031 for the wireless module 20 to be inserted therein. The wireless module 20 that enables wireless communication connection of the portable terminal is a wireless communication module such as an LTE or 3G wireless communication module. The wireless module 20 is inserted into the slot 1031 on the side surface 103 of the terminal body 10, and comprises a module base 201 and a module circuit board 202 fixed on the module base 201. Further, the module base 201 is provided at a side thereof with a module antenna 2011 electrically connected to the module circuit board 202; and when the wireless module 20 is inserted into the slot 1031 on the side surface 103 of the terminal body 10, the side of the module base 201 where the module antenna 2011 is disposed corresponds to an opening of the slot 1031. The module circuit board 202 and the terminal circuit board 104 are electrically connected.

The wireless module 20 further comprises a subscriber identification module (SIM) card 203 that is fixed on and electrically connected to the module circuit board 202. The module circuit board 202 is provided with at least some electronic devices (not shown) in a region corresponding to the SIM card 203. The SIM card 203 may be an SIM card of a mobile phone. Some circuits of the wireless module may be disposed in the region corresponding to the SIM card so as to reduce the size of the wireless module as much as possible.

The portable terminal of this embodiment has the wireless module 20 inserted into the side surface 103 of the terminal body 10, so the wireless module 20 will not be interfered by other signals from inside the terminal body 10. This not only makes full use of the space of the portable terminal but also improves the transceiving performance. Furthermore, by disposing the SIM card 203 on the module circuit board 202, the number of elastic piece pressing contacts between the wireless module 20 and the portable terminal can be reduced, and this can increase the pressing connection area to enhance the reliability of connection between the wireless module 20 and the portable terminal. Moreover, by disposing the electronic devices in the region of the module circuit board 202 that corresponds to the SIM card 203, the size of the wireless module can be reduced, which helps to design a thinner or even ultra-thin portable terminal.

The present disclosure further provides a wireless module as described above and a portable terminal that does not comprise a wireless module, which are the same as those described above and thus will not be further described herein.

What described above are only some of the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:
1. A portable terminal, comprising:
a terminal body; and
a wireless module;
wherein the terminal body comprises a front surface and a back surface opposite to each other, side surfaces connected to the front surface and the back surface, and a terminal circuit board disposed in a space defined by the front surface, the back surface and the side surfaces together, and a display region is disposed on the front surface;

the terminal body is provided on one of the side surfaces thereof with a slot for the wireless module to be inserted therein;

the wireless module comprises a module base, a module circuit board fixed on the module base, and an SIM (Subscriber Identification Module) card that is fixed on and electrically connected to the module circuit board;

the module circuit board is provided with at least some electronic devices in a region corresponding to the SIM card; and the module base is provided at a side thereof with a module antenna electrically connected to the module circuit board, and when the wireless module is inserted into the slot on the side surface of the terminal body, the side of the module base where the module antenna is disposed corresponds to an opening of the slot and the terminal circuit board is electrically connected to the module circuit board.

2. The portable terminal of claim 1, wherein:
the module antenna is an LDS (Laser Direct Structuring) antenna or an FPC (Flexible Printed Circuit) antenna or a steel antenna, and covers a side surface of the module base and matches with the side surface of the module base in shape.

3. The portable terminal of claim 1, wherein:
disposed at the side of the module base where the module antenna is disposed is a housing baffle used as an antenna support, and a length of the housing baffle used as the antenna support in a direction of the side surface of the terminal body is greater than a length of the rest of the wireless module in the same direction.

4. The portable terminal of claim 3, wherein:
the housing baffle used as the antenna support is a part of the wireless module, and the length of the housing baffle used as the antenna support in the direction of the side surface of the terminal body is greater than or equal to 85.60 mm.

5. The portable terminal of claim 1, wherein:
the module circuit board is provided with an antenna post protruding from a surface of the module circuit board that is adjacent to the module antenna, a feeding point is disposed on the module antenna at a location corresponding to the antenna post, and electrical connection between a side of the antenna post facing towards the module antenna and the feeding point of the module antenna is achieved through an elastic contact structure.

6. The portable terminal of claim 5, wherein:
the elastic contact structure is a probe or an elastic piece.

7. The portable terminal of claim 1, wherein:
the wireless module is a Long Term Evolution (LTE) or 3$^{rd}$-Generation (3G) wireless communication module.

8. The portable terminal of claim 1, wherein:
the terminal circuit board and the module circuit board are disposed side by side in a same plane when the wireless module is inserted into the slot located on the side surface of the terminal body.

9. The portable terminal of claim 8, wherein:
electrical connection between the terminal circuit board and the module circuit board is achieved through elastic piece pressing or through side plate pushing engagement.

10. The portable terminal of claim 8, wherein:
the terminal circuit board is provided with a notch at a side edge thereof, and the module circuit board is disposed within the notch at the side edge of the terminal circuit board when being electrically connected to the terminal circuit board.

11. The portable terminal of claim 1, wherein:
a guide rail for guiding insertion of the wireless module is disposed in the slot located on the side surface of the terminal body.

12. The portable terminal of claim 11, wherein:
the terminal circuit board is provided with a notch at a side edge thereof, the guide rail is disposed at two sides of the notch, the module circuit board is disposed within the notch at the side edge of the terminal circuit board when being electrically connected to the terminal circuit board, and the terminal circuit board and the module circuit board are disposed side by side in a same plane.

13. The portable terminal of claim 1, wherein:
a locating mechanism is disposed in the slot located on the side surface of the terminal body, and is adapted to lock the wireless module to a first predetermined position in the slot after the wireless module has been inserted into the slot and reached the first predetermined position.

14. The portable terminal of claim 13, wherein:
disposed at the side of the module base where the module antenna is disposed is a housing baffle used as an antenna support, a length of the housing baffle used as the antenna support in a direction of the side surface of the terminal body is greater than a length of the rest of the wireless module in the same direction, the slot is formed to have a greater width at an outer position than at an inner position to form the locating mechanism, and the length of the housing baffle used as the antenna support in the direction of the side surface of the terminal body matches with the width of the slot at the outer position and is greater than the width of the slot at the inner position.

15. The portable terminal of claim 13, wherein:
an unlocking mechanism is provided at the opening of the slot located on the side surface of the terminal body, and is adapted to release the locking of the wireless module when the wireless module is removed.

16. A wireless module, wherein:
the wireless module is adapted to be inserted into a slot located on one of side surfaces of a terminal body, and comprises a module base, a module circuit board fixed on the module base, and an SIM (Subscriber Identification Module) card that is fixed on and electrically connected to the module circuit board;

the module base is provided at a side thereof with a module antenna electrically connected to the module circuit board, and when the wireless module is inserted into the slot on the side surface of the terminal body, the side of the module base where the module antenna is disposed corresponds to an opening of the slot;

disposed at the side of the module base where the module antenna is disposed is a housing baffle that matches with the side surface of the terminal body in shape and that is used as an antenna support, and a length of the housing baffle used as the antenna support in a direction of the side surface of the terminal body is greater than a length of the rest of the wireless module in the same direction.

17. The wireless module of claim 16, wherein:
the module antenna is an LDS (Laser Direct Structuring) antenna or an FPC (Flexible Printed Circuit) antenna or a steel antenna, and covers a side surface of the module base and matches with the side surface of the module base in shape.

18. The wireless module of claim 16, wherein:
the length of the housing baffle used as the antenna support in the direction of the side surface of the terminal body is greater than or equal to 85.60 mm.

19. The wireless module of claim 16, wherein:
the module circuit board is provided with an antenna post protruding from a surface of the module circuit board that is adjacent to the module antenna, a feeding point is disposed on the module antenna at a location corresponding to the antenna post, and electrical connection between a side of the antenna post facing towards the module antenna and the feeding point of the module antenna is achieved through an elastic contact structure.

20. The wireless module of claim 19, wherein:
the elastic contact structure is a probe or an elastic piece.

21. The wireless module of claim 16, wherein:
the wireless module is an LTE (Long Term Evolution) or $3^{rd}$-Generation (3G) wireless communication module.

\* \* \* \* \*